United States Patent
Bodtker et al.

(10) Patent No.: US 10,160,472 B2
(45) Date of Patent: Dec. 25, 2018

(54) STEERING COLUMN WITH STATIONARY HUB

(71) Applicant: Steering Solutions IP Holding Corporation, Saginaw, MI (US)

(72) Inventors: Joen C. Bodtker, Gaines, MI (US); Eric D. Pattok, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 115 days.

(21) Appl. No.: 14/887,470

(22) Filed: Oct. 20, 2015

(65) Prior Publication Data
US 2017/0106894 A1    Apr. 20, 2017

(51) Int. Cl.
*B62D 1/10* (2006.01)
*B62D 1/06* (2006.01)
*B62D 1/185* (2006.01)
*B62D 1/183* (2006.01)

(52) U.S. Cl.
CPC ............. *B62D 1/105* (2013.01); *B62D 1/06* (2013.01); *B62D 1/183* (2013.01); *B62D 1/185* (2013.01)

(58) Field of Classification Search
CPC ............................. B60R 21/203; B62D 1/105
USPC ........................................................ 280/731
See application file for complete search history.

(56) References Cited

U.S. PATENT DOCUMENTS

| | | |
|---|---|---|
| 1,795,566 A | 3/1931 | MacComb |
| 1,944,905 A | 1/1934 | Rowell |
| 2,465,825 A | 3/1949 | Tucker |
| 2,622,690 A | 12/1952 | Barenyi |
| 3,734,051 A | 5/1973 | Dahl |
| 3,910,597 A | 10/1975 | Seko |
| 4,013,034 A | 3/1977 | Cantley et al. |
| 4,315,117 A | 2/1982 | Kokubo et al. |
| 4,337,967 A | 7/1982 | Yoshida et al. |
| 4,368,454 A | 1/1983 | Pilatzki |
| 4,429,588 A | 2/1984 | Emundts et al. |
| 4,485,371 A | 11/1984 | Yamada et al. |
| 4,503,300 A | 3/1985 | Lane, Jr. |
| 4,503,504 A | 3/1985 | Suzumura et al. |
| 4,561,323 A | 12/1985 | Stromberg |
| 4,603,599 A | 8/1986 | Matsuoka |

(Continued)

FOREIGN PATENT DOCUMENTS

| | | |
|---|---|---|
| CA | 1318833 C | 6/1993 |
| CN | 1722030 A | 1/2006 |

(Continued)

OTHER PUBLICATIONS

Chinese Office Action & Search Report for Chinese Application No. 2016103666609.X dated Dec. 20, 2017, including English Translation, 16 pgs.

(Continued)

*Primary Examiner* — Karen Beck
(74) *Attorney, Agent, or Firm* — Cantor Colburn LLP

(57) ABSTRACT

A steering column assembly is provided. The assembly includes a column shaft rotatable about an axis and configured to couple to a steering wheel rim and a hub support configured to be non-rotatably coupled to a support structure of the vehicle. A stationary hub is coupled to the hub support, the steering wheel rim being rotatable relative to the stationary hub.

14 Claims, 2 Drawing Sheets

(56) References Cited

U.S. PATENT DOCUMENTS

| | | | |
|---|---|---|---|
| 4,625,578 A | 12/1986 | Nishijima | |
| 4,635,029 A * | 1/1987 | Yamada | B60R 16/027 340/459 |
| 4,638,287 A * | 1/1987 | Umebayashi | B60R 16/027 180/78 |
| 4,674,352 A | 6/1987 | Mizuno et al. | |
| 4,691,587 A | 9/1987 | Farrand et al. | |
| 4,715,463 A | 12/1987 | Shimizu | |
| 4,766,326 A * | 8/1988 | Hayashi | B62D 1/105 200/61.54 |
| 4,771,650 A | 9/1988 | Kerner | |
| 4,771,846 A | 9/1988 | Venable et al. | |
| 4,825,972 A | 5/1989 | Shimizu | |
| 4,836,566 A | 6/1989 | Birsching | |
| 4,921,066 A | 5/1990 | Conley | |
| 4,962,570 A | 10/1990 | Hosaka et al. | |
| 4,967,618 A | 11/1990 | Matsumoto et al. | |
| 4,976,239 A | 12/1990 | Hosaka | |
| 5,072,628 A | 12/1991 | Oki | |
| 5,240,284 A | 8/1993 | Takada et al. | |
| 5,295,712 A | 3/1994 | Omura | |
| 5,319,803 A | 6/1994 | Allen | |
| 5,347,458 A | 9/1994 | Serizawa et al. | |
| 5,465,632 A | 11/1995 | Oki et al. | |
| 5,488,555 A | 1/1996 | Asgari | |
| 5,618,058 A | 4/1997 | Byon | |
| 5,668,721 A | 9/1997 | Chandy | |
| 5,690,362 A | 11/1997 | Peitsmeier et al. | |
| 5,765,116 A | 6/1998 | Wilson-Jones et al. | |
| 5,835,870 A | 11/1998 | Kagawa | |
| 5,893,580 A | 4/1999 | Hoagland et al. | |
| 5,911,789 A | 6/1999 | Keipert et al. | |
| 6,070,686 A | 6/2000 | Pollmann | |
| 6,109,651 A | 8/2000 | Frisch | |
| 6,142,504 A | 11/2000 | Papandreou | |
| 6,145,402 A * | 11/2000 | Nishitani | B62D 1/105 439/34 |
| 6,170,862 B1 | 1/2001 | Hoagland et al. | |
| 6,176,341 B1 | 1/2001 | Ansari | |
| 6,227,571 B1 | 5/2001 | Sheng et al. | |
| 6,301,534 B1 | 10/2001 | McDermott, Jr. | |
| 6,354,622 B1 | 3/2002 | Ulbrich et al. | |
| 6,360,149 B1 | 3/2002 | Kwon et al. | |
| 6,373,472 B1 | 4/2002 | Palalau et al. | |
| 6,381,526 B1 | 4/2002 | Higashi et al. | |
| 6,390,505 B1 * | 5/2002 | Wilson | B62D 1/181 280/775 |
| 6,394,218 B1 | 5/2002 | Heitzer | |
| 6,419,043 B1 | 7/2002 | Duval et al. | |
| 6,488,115 B1 | 12/2002 | Ozsoylu et al. | |
| 6,548,969 B2 | 4/2003 | Ewbank et al. | |
| 6,578,449 B1 | 6/2003 | Anspaugh et al. | |
| 6,588,540 B2 | 7/2003 | Graber et al. | |
| 6,612,393 B2 | 9/2003 | Bohner et al. | |
| 6,644,432 B1 | 11/2003 | Yost et al. | |
| 6,819,990 B2 | 11/2004 | Ichinose | |
| 6,955,623 B2 | 10/2005 | Pattok | |
| 7,021,416 B2 | 4/2006 | Kapaan et al. | |
| 7,048,305 B2 | 5/2006 | Muller | |
| 7,062,365 B1 | 6/2006 | Fei | |
| 7,295,904 B2 | 11/2007 | Kanevsky et al. | |
| 7,308,964 B2 * | 12/2007 | Hara | B62D 1/163 180/402 |
| 7,380,828 B2 * | 6/2008 | Menjak | B62D 1/02 200/61.54 |
| 7,428,944 B2 | 9/2008 | Gerum | |
| 7,461,863 B2 | 12/2008 | Muller | |
| 7,495,584 B1 | 2/2009 | Sorensen | |
| 7,628,244 B2 | 12/2009 | Chino et al. | |
| 7,665,572 B2 | 2/2010 | Yamanaka et al. | |
| 7,690,685 B2 * | 4/2010 | Sasaoka | B62D 3/02 280/513 |
| 7,719,431 B2 | 5/2010 | Bolourchi | |
| 7,735,405 B2 | 6/2010 | Parks | |
| 7,793,980 B2 | 9/2010 | Fong | |
| 7,862,079 B2 | 1/2011 | Fukawatase et al. | |
| 7,878,294 B2 | 2/2011 | Morikawa | |
| 7,894,951 B2 | 2/2011 | Norris et al. | |
| 7,909,361 B2 | 3/2011 | Oblizajek et al. | |
| 7,931,296 B2 * | 4/2011 | Choi | B60R 21/2032 280/728.2 |
| 8,002,075 B2 | 8/2011 | Markfort | |
| 8,027,767 B2 | 9/2011 | Klein et al. | |
| 8,055,409 B2 | 11/2011 | Tsuchiya | |
| 8,069,745 B2 | 12/2011 | Strieter et al. | |
| 8,079,312 B2 | 12/2011 | Long | |
| 8,146,945 B2 | 4/2012 | Born et al. | |
| 8,170,725 B2 | 5/2012 | Chin et al. | |
| 8,220,355 B2 | 7/2012 | Rouleau et al. | |
| 8,260,482 B1 | 9/2012 | Szybalski et al. | |
| 8,352,110 B1 | 1/2013 | Szybalski et al. | |
| 8,479,605 B2 | 7/2013 | Shavrnoch et al. | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 | 2/2014 | Matsuno et al. | |
| 8,670,891 B1 | 3/2014 | Szybalski et al. | |
| 8,695,750 B1 | 4/2014 | Hammond et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,881,861 B2 | 11/2014 | Tojo | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,950,543 B2 | 2/2015 | Heo et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,032,835 B2 | 5/2015 | Davies et al. | |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,108,584 B2 | 8/2015 | Rao et al. | |
| 9,114,827 B2 * | 8/2015 | Burns, Jr. | B62D 3/02 |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,111 B2 | 1/2016 | Davidsson et al. | |
| 9,235,211 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,308,891 B2 | 4/2016 | Cudak et al. | |
| 9,333,983 B2 | 5/2016 | Lathrop et al. | |
| 9,352,752 B2 | 5/2016 | Cullinane et al. | |
| 9,360,865 B2 | 6/2016 | Yopp | |
| 9,845,106 B2 | 12/2017 | Bodtker et al. | |
| 9,852,752 B1 | 12/2017 | Chou et al. | |
| 2002/0121153 A1 * | 9/2002 | Hoblingre | B60R 21/2032 74/492 |
| 2002/0189888 A1 | 12/2002 | Magnus et al. | |
| 2003/0046012 A1 | 3/2003 | Yamaguchi | |
| 2003/0094330 A1 | 5/2003 | Boloorchi et al. | |
| 2003/0127276 A1 | 7/2003 | Shimizu et al. | |
| 2003/0146037 A1 | 8/2003 | Menjak et al. | |
| 2003/0164060 A1 * | 9/2003 | Menjak | B62D 1/105 74/552 |

(56) References Cited

U.S. PATENT DOCUMENTS

| | | |
|---|---|---|
| 2003/0188918 A1 | 10/2003 | Shimizu et al. |
| 2003/0192734 A1 | 10/2003 | Bugosh |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0168848 A1 | 9/2004 | Bohner et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0202462 A1 | 9/2006 | Menjak et al. |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2008/0277178 A1* | 11/2008 | Poli .................. B60R 21/2032 180/78 |
| 2009/0024278 A1 | 1/2009 | Kondo et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Ulrich Stahlin et al. |
| 2010/0286869 A1 | 11/2010 | Katch et al. |
| 2010/0288567 A1 | 11/2010 | Bonne |
| 2011/0029200 A1 | 2/2011 | Shah |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1* | 8/2012 | Rombold ............. B60R 25/02 180/402 |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0319163 A1 | 12/2013 | Davies et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0136055 A1 | 5/2014 | Sugiyama |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0088357 A1 | 3/2015 | Yopp |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2016/0009311 A1 | 1/2016 | Khale et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0304123 A1* | 10/2016 | Lewis ................. B62D 5/043 |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0057541 A1* | 3/2017 | Bodtker ................. B62D 1/16 |
| 2017/0113712 A1 | 4/2017 | Watz |
| 2018/0072339 A1 | 3/2018 | Bodtker |
| 2018/0079442 A1 | 3/2018 | Lubischer et al. |

FOREIGN PATENT DOCUMENTS

| | | |
|---|---|---|
| CN | 1736786 A | 2/2006 |
| CN | 101037117 A | 9/2007 |
| CN | 101041355 A | 9/2007 |
| CN | 101108629 A | 1/2008 |
| CN | 101213124 A | 7/2008 |
| CN | 101341345 A | 1/2009 |
| CN | 101596903 A | 12/2009 |
| CN | 101674965 A | 3/2010 |
| CN | 101758855 A | 6/2010 |
| CN | 102452391 A | 5/2012 |
| CN | 103359151 A | 10/2013 |
| CN | 103419840 A2 | 12/2013 |
| CN | 103448785 A | 12/2013 |
| CN | 203460923 U | 3/2014 |
| CN | 104044629 A | 9/2014 |
| CN | 104512458 A | 4/2015 |
| CN | 104602989 A | 5/2015 |
| DE | 19523214 A1 | 1/1997 |
| DE | 19625503 C1 | 9/1997 |
| DE | 19923012 A1 | 11/2000 |
| DE | 10020085 C1 | 7/2001 |
| DE | 10036281 A1 | 7/2002 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| EP | 0339612 A2 | 11/1989 |
| EP | 0857638 A2 | 8/1998 |
| EP | 0931711 A1 | 7/1999 |
| EP | 1559630 A2 | 8/2005 |
| EP | 1783719 A2 | 5/2007 |
| EP | 1932745 A2 | 6/2008 |
| EP | 1990244 A1 * | 11/2008 ......... B60R 21/2032 |
| EP | 2384946 A2 | 11/2011 |
| EP | 2426030 A1 | 3/2012 |
| EP | 2489577 A2 | 8/2012 |
| EP | 2604487 A1 | 6/2013 |

(56) References Cited

FOREIGN PATENT DOCUMENTS

| | | | |
|---|---|---|---|
| EP | 1606149 | B1 | 5/2014 |
| FR | 2862595 | A1 | 5/2005 |
| FR | 3016327 | A1 | 7/2015 |
| JP | S60157963 | A | 8/1985 |
| JP | S6343846 | A | 2/1988 |
| JP | H05162652 | A | 6/1993 |
| JP | 2000355278 | A | 12/2000 |
| JP | 2004009989 | A | 1/2004 |
| JP | 2007253809 | A | 10/2007 |
| KR | 20100063433 | A | 6/2010 |
| WO | 2006099483 | A1 | 9/2006 |
| WO | 2010082394 | A1 | 7/2010 |
| WO | 2010116518 | A1 | 10/2010 |
| WO | 2015049231 | A1 | 4/2015 |

OTHER PUBLICATIONS

Chinese Office Action & Search Report for Chinese Application No. 201610609675.5 dated Feb. 27, 2018, including English translation, 19 pgs.
English Translation of Chinese Office Action & Search Report for Chinese Application No. 20161062032.9 dated Jan. 19, 2018, 12 pgs.
China Patent Application No. 201510204221.5 Second Office Action dated Mar. 10, 2017, 8 pages.
CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action regarding CN App. No. 201510204221.5; dated Aug. 29, 2016; 6 pgs.
Partial European Search Report for related European Patent Application No. 141569018, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
European Office Action for European Application No. 03075462.6 dated Jan. 4, 2010, 4 pages.
Chinese Office Action & Search Report for Chinese Application No. 201610774207.3 dated Apr. 4, 2018, including English Translation, 14 pgs.
English Translation of Chinese Office Action and Search Report for Chinese Application No. 201611113748.8 dated May 30, 2018, 12 pages.

\* cited by examiner

STEERING COLUMN WITH STATIONARY HUB

FIELD OF THE INVENTION

The following description relates to steering column assemblies and, more specifically, to a steering column assembly with a stationary hub.

BACKGROUND

When some vehicles are fitted with autonomous driving assist systems, it may become possible to retract the steering column and wheel away from the driver to provide space for non-driving related activities such as working, reading, and game playing. However, in some systems, the steering wheel may continue to rotate when the autonomous driving system is active.

Accordingly, it is desirable to provide a vehicle with a non-moving structure that may be utilized for non-driving related activities.

SUMMARY OF THE INVENTION

In one exemplary embodiment of the invention, a steering column assembly is provided. The assembly includes a column shaft rotatable about an axis and configured to couple to a steering wheel rim and a hub support configured to be non-rotatably coupled to a support structure of the vehicle. A stationary hub is coupled to the hub support, the steering wheel rim being rotatable relative to the stationary hub.

In another exemplary embodiment of the invention, a vehicle having a steering column is provided. The vehicle includes a stationary support structure and a column shaft rotatable about an axis. A steering wheel rim is coupled to the column shaft and a hub support is non-rotatable coupled to the stationary support structure. A stationary hub is coupled to the hub support, the steering wheel rim being rotatable relative to the stationary hub.

In yet another embodiment of the invention, a method of assembling a steering column assembly is provided. The method includes providing a column shaft rotatable about an axis and coupling a steering wheel rim to the column shaft. A hub support is non-rotably coupled to a support structure of the vehicle. A stationary hub is coupled to the hub support, the steering wheel rim being rotatable relative to the stationary hub.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
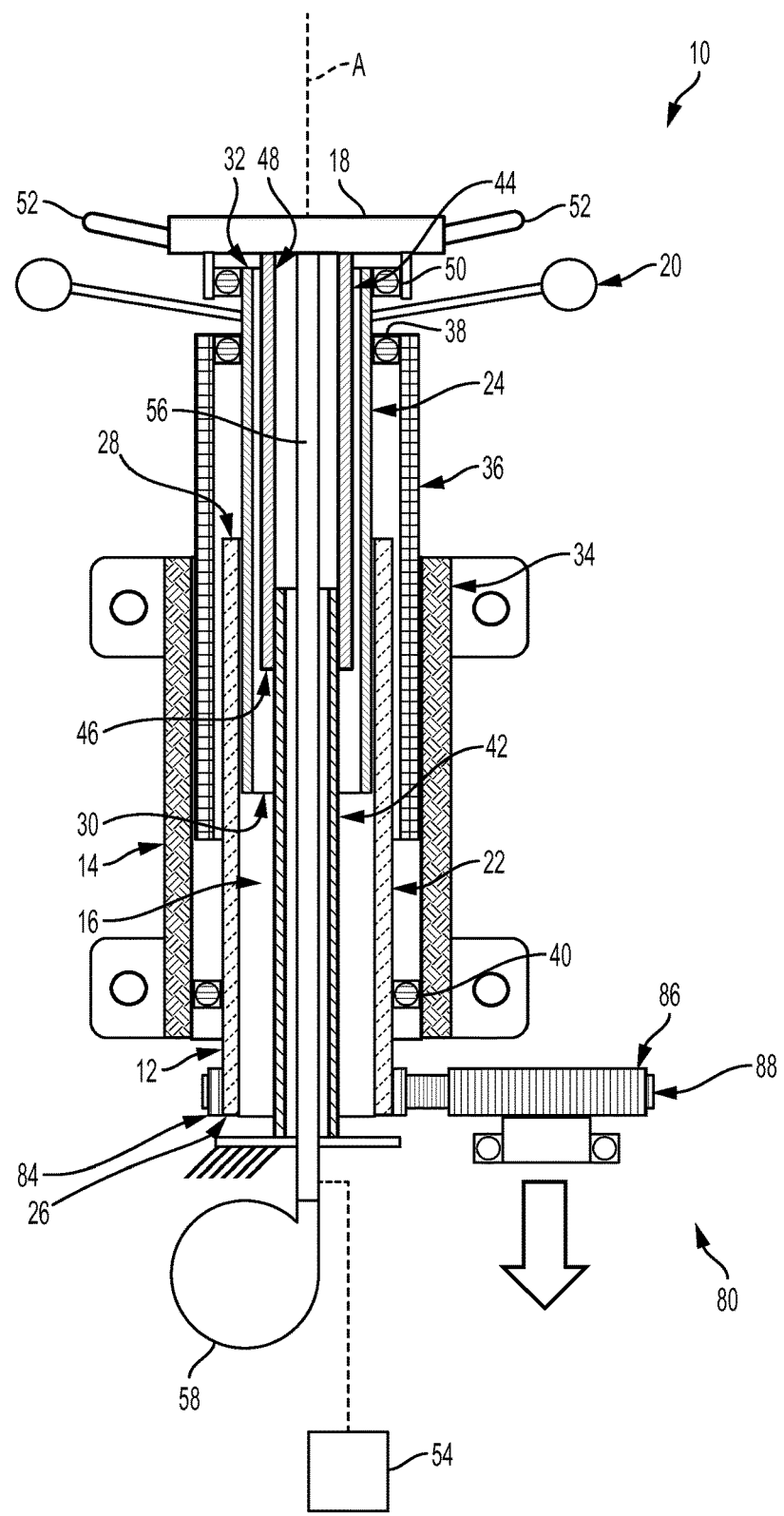
FIG. 1 illustrates an exemplary steering column assembly according to one embodiment of the disclosure.

Referring now to the Figures, where the invention will be described with reference to specific embodiments, without limiting same, FIG. 1 illustrates an exemplary steering column assembly 10 that generally includes a steering column shaft 12, a column jacket 14, a hub support 16, a stationary steering wheel hub 18, and a steering wheel rim 20. In an exemplary embodiment, steering column assembly 10 is adjustable in a rake direction and a telescope direction.

Steering shaft 12 extends along an axis 'A' and includes a lower shaft 22 and an upper shaft 24. Lower shaft 22 includes a first end 26 and an opposite second end 28. Upper shaft 24 includes a first end 30 and an opposite second end 32. Upper shaft first end 30 is disposed within lower shaft 22 such that upper shaft 24 is telescopically and slidingly disposed within lower shaft 22. Upper shaft second end 32 is coupled to steering wheel rim 20, and steering shaft 12 is rotatable about axis 'A' and is configured to transmit torque from wheel 20 to vehicle road wheels (not shown). Alternatively, upper shaft 24 may be slidingly disposed about lower shaft 22.

Column jacket 14 extends along axis 'A' and includes a lower jacket 34 and an upper jacket 36. Jacket 14 surrounds and supports shaft 12 via upper bearings 38 and lower bearings 40 disposed between shaft 12 and jacket 14. In the exemplary embodiment, jacket 14 extends coaxially with steering shaft 12, which is rotatably connected to upper jacket 36. Lower jacket 34 is coupled to a stationary part of the vehicle such as the vehicle chassis (not shown), and upper jacket 36 is telescopically and slidingly disposed at least partially within lower jacket 34. Alternatively, upper jacket 36 may be slidingly disposed about lower jacket 34.

Hub support 16 extends along axis 'A' and includes a lower hub support 42 and an upper hub support 44 surrounded by steering shaft 12. In the exemplary embodiment, hub support 16 extends coaxially with steering shaft 12 and column jacket 14. Lower hub support 42 is coupled to a stationary part of the vehicle such as the vehicle chassis, and upper hub support 44 is telescopically and slidingly disposed at least partially about lower hub support 42. As such, upper hub support 44 includes a first end 46 disposed about lower hub support 42, and a second end 48 coupled to stationary hub 18. A bearing 50 is disposed between stationary hub 18 and upper shaft 24 to facilitate rotation of shaft 12 about axis 'A'. Alternatively, upper hub support 44 may be slidingly disposed within lower hub support 42. In some embodiments, hub support 16 may be pivotally mounted to the vehicle to facilitate raking movement of steering column assembly 10.

In the illustrated embodiment, stationary hub 18 is coupled to upper hub support second end 48. Because lower and upper hub supports 42, 44 are fixed from rotation about axis 'A', stationary hub 18 is fixed from rotation about axis 'A'. However, due to telescoping movement, upper hub support 44 and thus stationary hub 18 may be translated a predefined distance along axis 'A'. As such, stationary hub 18 is non-rotatably attached to telescoping hub support 16.

One or more switches 52 may be coupled to stationary hub 18 to provide control of various functions of the vehicle. For example, switches 52 may be a wiper control stalk, a vehicle light control stalk, a turn signal stalk, a power telescope/rake switch, or the like. Switches may be in electrical and/or signal communication with a vehicle controller 54 via a conduit 56 (e.g., electrical wire, optical, etc.) or other mode (e.g., wireless). As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the illustrated embodiment, conduit 56 is disposed within hub support 16, which provides a direct pathway for communication with switches 52. A cord reel 58 may be provided to take up slack of conduit 56 during telescoping movement of column assembly 10. Moreover, electrical devices (e.g., video screen, computer, device charger, etc.) may be disposed on or within stationary hub 18 and connected to conduit 56.

Figure 2:
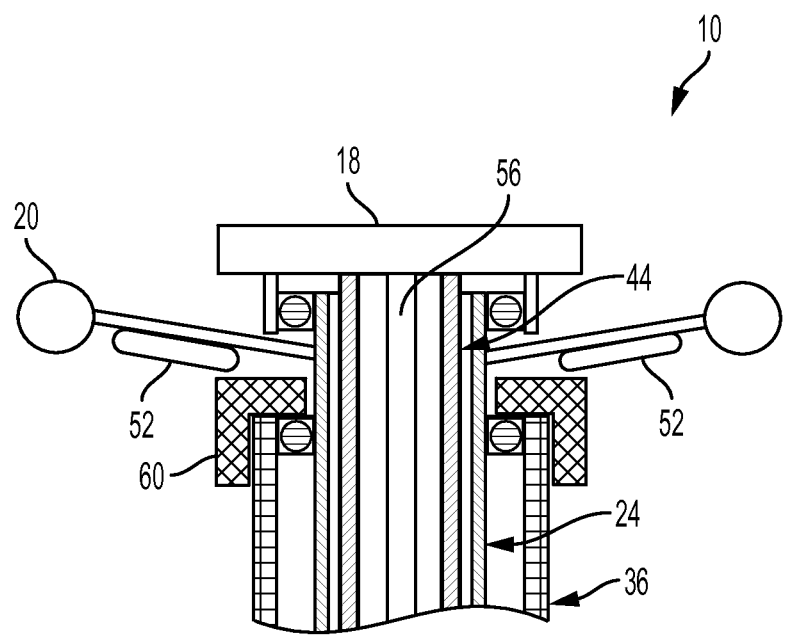
FIG. 2 illustrates an exemplary steering column assembly according to another embodiment of the disclosure.

In another embodiment illustrated in FIG. 2, switches 52 may be coupled to steering wheel 20. A coil 60 is provided adjacent steering wheel 20 and switches 52 to provide electrical and signal communication with switches 52. Coil 60 may be electrically and signally connected to a harness (not shown) or like component, which may extend along an outer surface of column jacket 14.

With further reference to FIG. 1, steering column assembly 10 may include a power transfer or power take-off system 80 that generally includes a drive pulley 84 and a driven pulley 86. Drive pulley 84 is coupled to shaft 12 and transmits torque to driven pulley 86 via a belt 88. Driven pulley 86 transmits torque to an intermediate shaft (not shown).

A method of assembling steering column assembly 10 includes providing telescoping column shaft 12 with lower shaft 22 and upper shaft 24, providing telescoping column jacket 14 with lower jacket 34 and upper jacket 36, and providing telescoping hub support 16 with lower hub support 42 and upper hub support 44. Column shaft 12 is disposed at least partially within column jacket 14, and hub support 16 is disposed at least partially within column shaft 12 such that column shaft 12, column jacket 14, and hub support 16 are concentrically mounted. Hub support 16 is coupled to a stationary part of the vehicle such that hub support is stationary and does not rotate about axis 'A'. Wheel rim 20 is coupled to column shaft 12 for rotation therewith, while stationary hub 18 is coupled to hub support 16. As such, hub 18 remains stationary while wheel rim 20 is rotatable to steer the vehicle.

Described herein are systems and methods providing a steering column assembly with a non-rotating hub. A telescoping hub support is disposed within a telescoping steering shaft, which is in turn disposed within a telescoping column jacket. The hub support is non-rotatably coupled to the vehicle mounting structure at one end, and a stationary hub is mounted to the opposite end. A steering wheel rim is coupled to the steering shaft for rotation therewith relative to the stationary hub. The hub support provides a pathway for electrical/signal communication with switches/devices that may be disposed on or around the stationary hub and/or steering wheel rim.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a column shaft rotatable about an axis and configured to couple to a steering wheel rim;
    a hub support configured to be non-rotatably coupled to a first stationary support structure of a vehicle;
    a stationary hub coupled to the hub support, the steering wheel rim rotatable relative to the stationary hub;
    a drive mechanism operatively coupled to the column shaft, the drive mechanism transmitting torque between the column shaft and an intermediate shaft; and
    a column jacket coupled to a second stationary support structure of the vehicle, the hub support, the column shaft and the column jacket concentrically and coaxially oriented relative to each other, the column shaft radially outward of the hub support, the column jacket radially outward of the column shaft.

2. The assembly of claim 1, wherein the column shaft includes a first shaft slidingly disposed within a second shaft, the column shaft configured for telescopic movement.

3. The assembly of claim 1, wherein the hub support includes a first hub support slidingly disposed within a second hub support, the hub support configured for telescopic movement.

4. The assembly of claim 1, further comprising:
    one or more electrical devices coupled to the stationary hub; and
    a conduit disposed within the hub support and coupled to the one or more electrical devices to provide signal and/or electrical communication therewith, the hub support extending about a central, longitudinal axis of the steering column assembly.

5. The assembly of claim 1, further comprising:
    one or more electrical devices coupled to the steering wheel rim;
    an electrical coil disposed adjacent the steering wheel rim; and
    a conduit disposed within the hub support and coupled to the electrical coil to provide signal and/or electrical communication with the one or more electrical devices, the hub support including a first hub support slidingly disposed within a second hub support, the hub support configured for telescopic movement, the first and second hub supports extending about a central, longitudinal axis of the steering column assembly.

6. The steering column assembly of claim 1, wherein the drive assembly comprises:
    a drive pulley coupled to the column shaft; and
    a driven pulley operatively coupled to the drive pulley with a belt, the driven pulley operatively coupled to the intermediate shaft.

7. The assembly of claim 1, wherein the column jacket includes a first jacket slidingly disposed within a second jacket, the column jacket configured for telescopic movement.

8. A vehicle comprising:
    a first stationary support structure;
    a column shaft comprising an upper column shaft and a lower column shaft, the column shaft rotatable about an axis;
    a steering wheel rim coupled to the upper column shaft;
    a hub support non-rotatably coupled to the first stationary support structure;
    a stationary hub coupled to the hub support, the steering wheel rim rotatable relative to the stationary hub;
    a drive mechanism comprising a pulley assembly operatively coupled to the lower column shaft and to an additional shaft, the drive mechanism transmitting torque between the column shaft and the additional shaft; and a column jacket coupled to a second stationary support structure of the vehicle, the hub support, the column shaft and the column jacket concentrically and coaxially oriented relative to each other, the column shaft radially outward of the hub support, the column jacket radially outward of the column shaft.

9. The vehicle of claim 8, wherein the upper column shaft is slidingly disposed within lower column shaft, the column shaft configured for telescopic movement.

10. The vehicle of claim 8, wherein the hub support includes a first hub support slidingly disposed within a second hub support, the hub support configured for telescopic movement.

11. The vehicle of claim 8, further comprising:
one or more electrical devices coupled to the stationary hub; and
a conduit disposed within the hub support and coupled to the one or more electrical devices to provide signal and/or electrical communication therewith, the hub support extending about a central, longitudinal axis of the steering column assembly.

12. The vehicle of claim 8, further comprising:
one or more electrical devices coupled to the steering wheel rim;
an electrical coil disposed adjacent the steering wheel rim; and
a conduit disposed within the hub support and coupled to the electrical coil to provide signal and/or electrical communication with the one or more electrical devices, the hub support including a first hub support slidingly disposed within a second hub support, the hub support configured for telescopic movement, the first and second hub supports extending about a central, longitudinal axis of the steering column assembly.

13. The vehicle of claim 8, wherein the column jacket includes a first jacket slidingly disposed within a second jacket, the column jacket configured for telescopic movement.

14. A method of assembling a steering column assembly comprising:
providing a column shaft rotatable about an axis;
coupling a steering wheel rim to the column shaft;
non-rotatably coupling a hub support to a first stationary support structure of the vehicle, the column shaft located radially outward of the hub support and concentric about the hub support;
coupling a stationary hub to the hub support, the steering wheel rim rotatable relative to the stationary hub;
coupling a column jacket to a second stationary support structure of the vehicle, the column jacket concentric about and coaxial with the column shaft; and
coupling a pulley assembly of a drive mechanism to the column shaft and to an additional shaft to transmit torque between the column shaft and the additional shaft.

* * * * *